D. M. PARK.
INSTRUMENT FOR COMPUTING FRACTIONS.
APPLICATION FILED JAN. 3, 1910.
978,637.
Patented Dec. 13, 1910
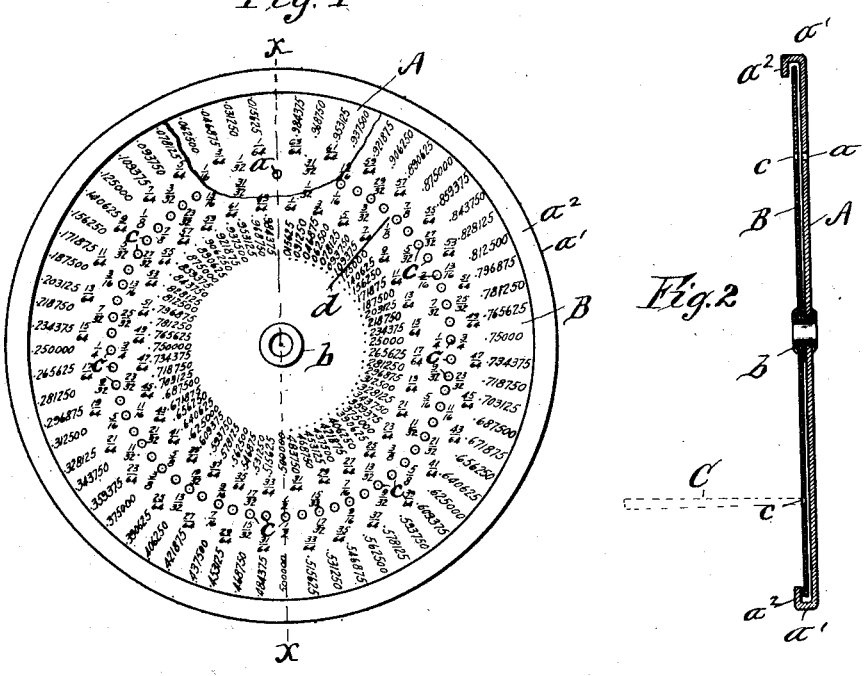

UNITED STATES PATENT OFFICE.

DAVID M. PARK, OF ERIN, NEW YORK, ASSIGNOR OF TWO-THIRDS TO HOMER A. TIFFANY, OF SYRACUSE, NEW YORK.

INSTRUMENT FOR COMPUTING FRACTIONS.

978,637.     Specification of Letters Patent.     Patented Dec. 13, 1910.

Application filed January 3, 1910. Serial No. 536,071.

*To all whom it may concern:*

Be it known that I, DAVID M. PARK, a citizen of the United States, and resident of Erin, in the county of Chemung, in the State of New York, have invented new and useful Improvements in Instruments for Computing Fractions, of which the following, taken in connection with the accompanying drawings, is a full, clear, and exact description.

This invention relates to instruments which are used for computing numbers.

The object of the present invention is to provide a simple and inexpensive instrument which can be conveniently manipulated for the purpose of accurately adding and subtracting either common fractions or decimal fractions, and to that end it resides in the novel construction of the computing-instrument hereinafter fully described and claimed.

In the accompanying drawings forming part of my application, Figure 1 illustrates a front view of the computing-instrument with the rotatable transparent disk broken away; and Fig. 2 is a transverse section on the line —X—X—.

Like characters of reference indicate like parts in the said drawings.

The instrument comprises essentially a base —A— designed to be held in the hand of the user or otherwise maintained stationary, and a disk —B— mounted rotatably on the said base. I prefer to form this base of aluminum in order to reduce the weight of the instrument to the minimum so that it may be conveniently handled and carried in the pocket. This base is preferably of circular shape and its front is provided with a dial containing two concentrically disposed annularly arranged scales of common fractions, and between the two scales the base is provided with an aperture —a— which is designated "zero" from which the two scales are graduated in opposite directions. To facilitate the reading of the fractions, I separate the two scales by a circular line. At "zero" the dial is preferably provided with a long radial line. The said dial also contains two concentrically arranged scales of decimal fractions oppositely graduated from the "zero-line," one surrounding the outer scale of common fractions and the other being arranged within the inner scale of common fractions.

It is obvious that the dial may consist of a thin disk of paper or other material suitably secured to the base, however, the front face of the base may have the fractions and decimals printed thereon or otherwise applied to form the said dial as shown. The disk —B— is designed to completely cover the dial and is transparent to enable the fractions to be read therethrough. Said disk is preferably composed of celluloid and is supported revolubly by means of an eyelet or rivet —b—, and it is provided with an annular series of apertures —c—c— disposed concentrical with the scales. These apertures correspond in number to the fractions of each scale and are designed to be brought consecutively into registry with the aperture —a— in the base incident to the rotation of the disk. In practice, the point of a pencil or other suitable device is inserted into an aperture —c— for the purpose of rotating the disk, during which rotation the point is caused to enter the aperture —a— to limit the movement of the said disk.

I prefer to form the periphery of the base —A— with a rim —$a^1$— closely embracing the margin of the disk —B—, said rim being flanged inwardly as indicated at —$a^2$—.

It will be understood that the flange is formed after the disk has been secured to the base. By making this flange of considerable width, the base can be conveniently held by the hand of the manipulator without interfering with the rotation of the disk.

On the disk —B— is provided an indicator —d— consisting of a radial line printed or otherwise marked thereon and disposed within the annular series of apertures so as to point to any one of the fractions or "zero." This indicating-line is to be set at "zero" before manipulating the instrument when adding the fractions, and in subtracting one fraction from another the said line is to be set at the minuend. For example, assuming that the common fractions "1/64", "3/32" and "5/16" are to be added: The user of the instrument, after setting the indicating-line at "zero", inserts the point of a pencil or other suitable pointed device —C— (shown by dotted lines), into the aperture —c— corresponding to the fraction "1/64" and by means of said device rotates the disk —B— to the right. In rotating the disk, the device is caused to enter the aperture —a— in the base which aperture serves as a stop to arrest the movement of the disk. The pointed device —C— is then inserted into the aperture —c— corresponding to the fraction "3/32" and the disk again rotated to the right, whereby the said device is caused to enter the aperture to arrest the rotation of the disk as before. The said device is now inserted into the aperture corresponding to the fraction "5/16", to again rotate the disk and when the rotation is arrested by the entering of the device into the aperture, and the indicating line will point to "27/64" which is the sum of the aforesaid fractions. It will be understood that in adding the fractions in either scale, the sum is read in the other scale. It will also be understood, that to add decimal fractions in either scale the disk is rotated in the same direction and the sum read in the other scale.

When it is desired to subtract either common or decimal fractions, the disk is rotated to the left, in which instance the indicating-line is set at the minuend before rotation. For example, assuming the fraction "27/64" is to be subtracted by the fraction "5/16", the said indicating line is set at the latter fraction in either scale, then by inserting the pencil or other pointed device in the aperture —c— corresponding to the other fraction, and rotating the disk to the left as stated, the said device is caused to enter the aperture —a— representing "zero" and thus the movement of the disk is arrested, whereupon the indicating line will point to "7/64" in the same scale which is the remainder.

From the foregoing, it will be evident that the described instrument will accurately add or subtract fractions in a very short space of time, and is thus particularly useful to draftsmen in "checking" so-called working drawings of machinery etc.

Having described my invention, what I claim is:—

1. A computing-instrument comprising a base having a dial presenting a scale of fractions and provided with a stop, a transparent member supported movably on the base and covering the dial, and provided with a series of apertures corresponding to the fractions of the scale, and having an indicating line marked thereon, the said series of apertures being arranged to be brought consecutively to the stop, incident to the movement of the transparent member, and the indicating line disposed to point to the fractions of the scale for the purpose set forth.

2. An instrument for adding and subtracting comprising an annular base provided on one face with a dial presenting an annular series of fractions and marked with "zero", said base having an aperture disposed at "zero", and an annular transparent disk pivoted centrally upon the base and completely covering the dial and provided with an annular series of apertures disposed concentric with the scale, said apertures being designed to receive a device for rotating the disk to bring the apertures consecutively into registry with the aperture in the base incident to the rotation of the disk, the said disk having marked thereon a radial line extending to one of the apertures and serving as an indicator designed to be set at "zero" when rotating the disk in one direction for adding fractions and to be set at the minuend when rotating the disk in the opposite direction for subtracting and serving to point to the sum of the added fractions and to the remainder in the subtraction as set forth and shown.

3. An instrument for adding and subtracting comprising a stationary annular base provided on its top face with a dial presenting oppositely graduated annular scales of common fractions arranged concentrically, and also oppositely graduated scales of decimal fractions arranged likewise and including "zero", said base being provided with an aperture disposed at "zero" and serving as a stop, a transparent annular disk mounted rotatably upon the base and completely covering the dial, said disk being provided with an annular series of apertures disposed concentric with the scales and corresponding in number to the fractions thereof, and the said apertures being designed to receive a device operative for rotating the disk to bring its apertures consecutively into registry with the aperture in the base, the said disk having marked thereon a radial line extending to one of the apertures and serving as an indicator designed to be set at "zero" previous to rotating the disk in one direction for adding fractions, and to be set at the minuend previous to rotating the disk in the opposite direction when subtracting and also serving to point to the sum of the added fractions and also to the remainder in the subtraction as set forth and shown.

DAVID M. PARK.

Witnesses:
HOMER A. TIFFANY,
H. A. LOVELACE.